Sept. 27, 1960    P. M. CARLSSON ET AL    2,954,285
METHOD AND APPARATUS FOR THE FERMENTATION OF WASTE
MATERIALS CONTAINING ORGANIC CONSTITUENTS
Filed Dec. 9, 1953    2 Sheets-Sheet 1
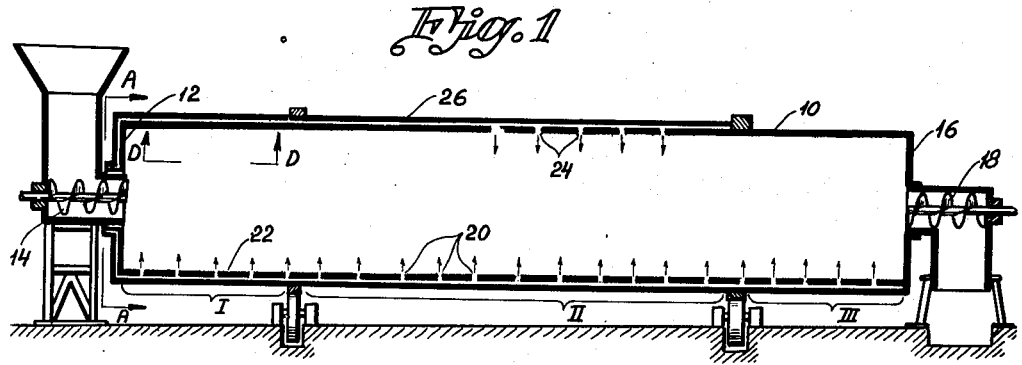
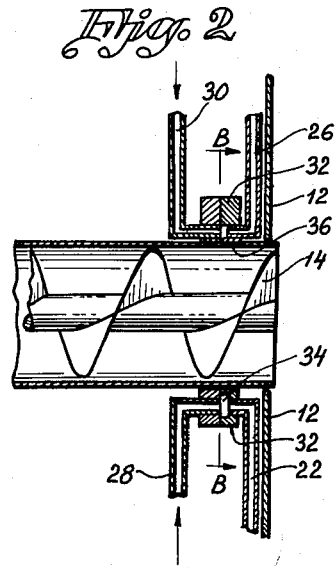 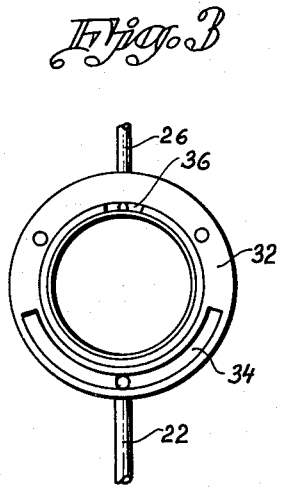 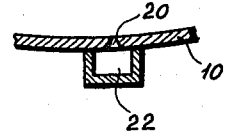
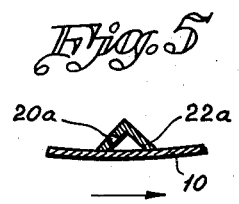
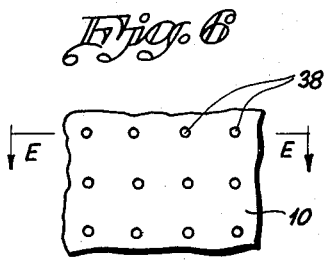 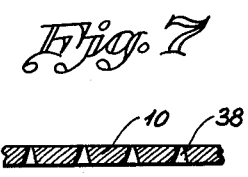

Sept. 27, 1960     P. M. CARLSSON ET AL     2,954,285
METHOD AND APPARATUS FOR THE FERMENTATION OF WASTE
MATERIALS CONTAINING ORGANIC CONSTITUENTS
Filed Dec. 9, 1953     2 Sheets-Sheet 2
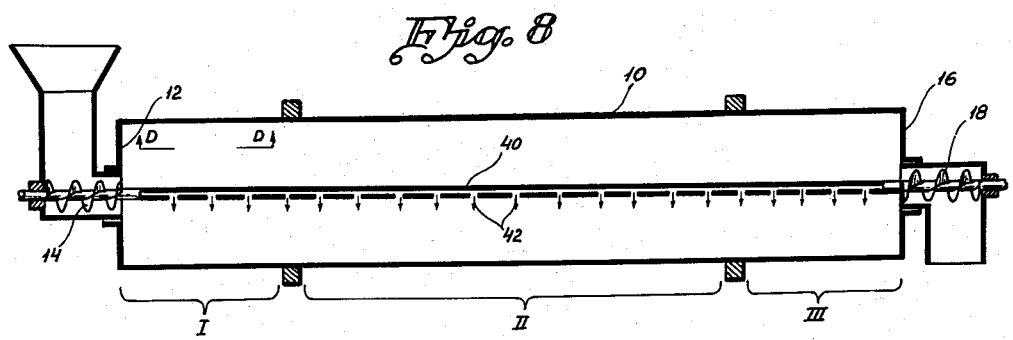
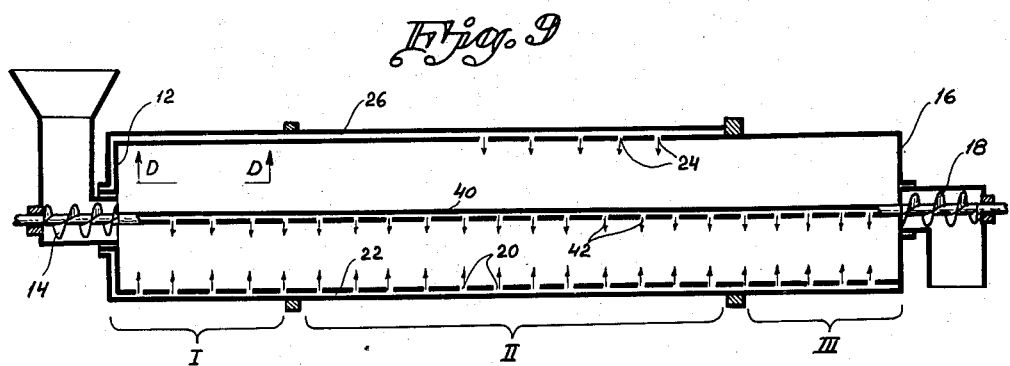
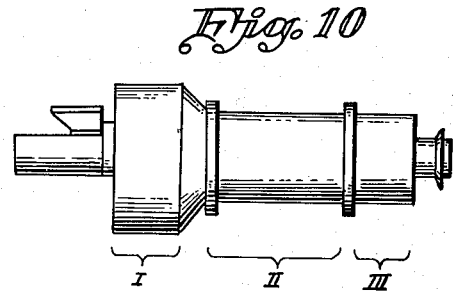
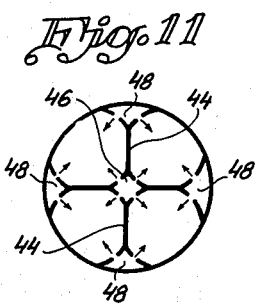

United States Patent Office 2,954,285
Patented Sept. 27, 1960

2,954,285

METHOD AND APPARATUS FOR THE FERMENTATION OF WASTE MATERIALS CONTAINING ORGANIC CONSTITUENTS

Peter Marius Carlsson, Hortensiavej 8, Frederiksberg, Denmark, and Kai Finn Petersen, Sollerod, Denmark. (Christiansgave 5, Rungsted, Denmark)

Filed Dec. 9, 1953, Ser. No. 397,157

Claims priority, application Denmark Dec. 11, 1952

8 Claims. (Cl. 71—9)

This invention refers to the processing of waste materials containing organic constituents, such as house refuse or garbage, refuse or garbage from kitchens, hotels, and hospitals from nurseries, gardens, farms, and various industrial undertakings, e.g. slaughterhouses, but also of sewage sludge, such as putrefied or non-putrefied sludge, activated sludge, and excrementitious matter. For the processing of such materials, it has been suggested to subject the materials to a fermentation for the decomposition of the waste materials into compost.

It is known for this purpose to subject the materials to an aerobic thermophilic fermentation, which is accompanied by a powerful generation of heat.

Chambers which are filled with the waste materials have been used to carry out the fermentation. Air ducts are disposed in the interior of the chambers to supply the air necessary for aerobic fermentation, whereas the gases which are generated in the process of fermentation may leave the chambers through a suitable discharge.

In such chambers the waste materials are thus subjected to a thermophilic fermentation in the state in which they exist. As is known, however, waste materials of the said nature is of a heterogeneous and changing composition, so that at some places in the mass of material filled into the chamber there will be a lack of one or more of the nutrients, which are necessary for the animal functions of the thermophilic micro-organisms, and also that the moisture required for the said functions is not present in the proper local distribution. The consequence of such conditions is that at some places the thermophilic fermentation will not take place, or only at a very low rate. Other factors may also cause the thermophilic fermentation to fail, e.g. that the air necessary for the fermentation does not penetrate the whole of the mass of material filled into the chamber but takes the shortest route to the discharge, e.g. longitudinally of the air ducts.

The waste materials will therefore not ferment homogeneously, and the decomposition of the materials will take a long time and be incomplete.

It has therefore been suggested to agitate the waste materials during the fermentation in a continuously or at timed intervals rotating container. When placed in such a container the waste materials will be intimately mixed, and the percentage of moisture will be virtually the same throughout the mass of material. At the same time one of the conditions for the penetration by air of the whole of the mass of material so as to obtain uniform fermentation is created.

In known rotating fermentation containers air is supplied from nozzles in one end plate of the container or in close proximity thereto, whereas the gases which are generated in the process of fermentation are discharged from the other end plate of the container. Thus the air flows through the rotating container in substantially the axial direction thereof.

By this axially directed flow of the air there is a risk, however, that the mass of material is not homogeneously penetrated by the air. This is partly due to the fact that even though the degree of filling is 100 percent the mass of material will settle in the container during rotation, so that the air will try to find its way longitudinally of the walls of the container and of the uppermost part of its shell, so as to reach by the easiest route the other end plate of the container, wherefrom the air is discharged without having sufficiently contributed to the fermentation of the waste materials.

This entails the disadvantage that the fermentation process considered as a whole proceeds slowly and unevenly, and that the decomposition of the waste materials requires comparatively long time, if it is to be complete.

To increase the pressure with which the air is supplied would be but a poor solution to the aeration problem in the known apparatus. In the first place the risk will arise that the air outlet in the discharge end of the container is clogged up with loose waste material. Absence of outlet for the air, however, causes an accumulation of $CO_2$, generated during fermentation, so that the fermentation process may come to a stop or become anaerobic, which is highly undesirable. In the second place the fermentation process will also cease at places where excessive quantities of air are supplied owing to the uneven distribution of the air, in which case a desiccated layer is formed surrounding the particles of waste material, which layer prevents fermentation.

On the other hand, it is of decisive importance for the practical accomplishment of the fermentation process that the air be admitted to the container under pressure, so that the air is evenly distributed in the mass filled into the container in order to obtain complete decomposition of the waste materials.

Theoretically, such a distribtuion might also be obtainable by drawing the air into the container. However, it is hardly possible by this method to avoid the obstruction by loose waste material of the suction nozzles or apertures, for which reason such a procedure must be considered unfortunate.

It will now be understood that only the proper interplay and uniform distribution of moisture, heat, and aeration medium in the waste material will cause in the shortest possible time the complete decomposition thereof, so that a greatest possible quantity of the carbo-hydrates, proteins, cellulose, and lignin contained in the materials is transformed by the thermophilic aerobic bacteria into humus.

It is a main object of this invention to provide a method for the fermentation of waste materials of the kind referred to by subjecting the materials to an aerobic thermophilic fermentation in a rotating container under artificial aeration in such a manner, that the drawbacks demonstrated in the foregoing are obviated.

It is another object of the invention to provide a method, by means of which the waste materials may become homogeneously aerated in order to obtain an aerobic, thermophilic fermentation of all the waste materials during their treatment in the container.

It is a further object of the invention to provide a method, by means of which the treatment of the waste materials may be accelerated in such a manner that the materials are more or less readily fermented when leaving the container, so that the process of fermentation of waste materials of the kind referred to may be a continuous one.

It is a still further object of the invention to provide a method, by means of which the fermentation of waste materials of the kind referred to may be controlled in such a manner, that the waste materials are extremely fermented when having passed the container.

It is also among the objects of the invention to provide a method, by means of which the fermentation may be performed at low expenditure and in a reliable manner and a simple way.

The process of the present invention in general comprises the introduction of waste materials containing organic constituents into a rotatable, preferably a horizontally disposed cylindrical container and introducing an aeration medium consisting of an oxygen containing medium in a radial or substantially radial direction into said materials, preferably into that part of the material contents being in the lower part of the container.

As compared with the known admission of the air in axial direction of the container, an improved distribution of the air in the longitudinal direction of the container is thereby obtained, seeing that the aeration medium will be able to penetrate into the mass contained in the container over a larger surface than is the case of the known method. During the rotation of the container the aeration medium will be able to evenly penetrate the whole of the material, so as to achieve intimate contact with the individual particles of the materials to effect homogeneous and quick fermentation of the whole of the mass in the container.

The uniform distribution of the aeration medium through the whole of the mass of waste materials filled into the container which is produced by radial admission, will accelerate the fermentation of said materials to such a material degree that according to the invention it is rendered possible to carry out the fermentation of the waste materials in the container as a continuous uninterrupted process. According to the invention the waste materials may be fed into the one end of the container and advanced in axial direction and continously through the container, the length of which is so designed that in general, a preheating zone, a main fermentation zone, and a drying zone may be established during the advance of the materials, the rate of advance being so restricted that the waste materials have been extensively fermented when leaving the container at its other end.

By this continuous treatment of the material the present method will be definitely superior to methods hitherto known, seeing that previously the material has been processed in individual charges, the containers being emptied every time the fermentation of the mass had been complete and thereupon refilled. According to the present invention, however, the materials may travel continuously through the container. The term "continuously" is to be so understood that the entire process of treatment in the container has a continuous character, seeing that the material will travel through the container from its feed end to its discharge end and be subjected to a fermentation during this travel. The said characteristic will apply even though in practice the feeding and emptying wil take place over a period of e.g. 8 hours a day.

Considering that the demand for aeration medium in the individual zones of the container may differ, the idea of the invention furthermore conveys the possibility that the admission of aeration medium be varied over the length of the container.

The invention also relates to apparatus for carrying the method into effect. The apparatus comprises a horizontal rotatable container provided with members for artificial aeration, and according to the idea of the invention the apparatus also comprises members for the radial admission of aeration medium, preferably along a considerable length of the container.

According to the invention this may either be effected by apertures or nozzles disposed over part of the shell of the container and forming part of the aeration members, which said apertures or nozzles are open to the interior of the container and are in connection with a source of air under relative pressure, the arrangement being preferably such that aeration medium is only admitted of those parts of the container being the lowermost ones during its rotation.

A second possibility of effecting the admission of air may be provided according to the invention in that the aeration members comprise an aeration medium feeding device, e.g. a tube, which extends into the interior of the container in the axial direction thereof, and which over part of its surface is provided with apertures connecting the hollow of the device with the interior of the container, said device being in connection with a source of air under relative pressure.

As against the latter suggestion, however, the former design involves the advantages of improved possibilities for cleaning the admission apertures or nozzles, and also that the aeration medium will be better distributed in radial direction over the waste materials filled into the container.

If, according to the invention, removal apertures for the gases from the container, i.e. in general the aeration medium, the oxygen content of which has been consumed, and which has been enriched with $CO_2$, are substantially disposed in proximity to the place at which the waste materials are fed into the container, the aeration medium heated in the fermentation zone will travel counterflow with newly fed materials, so that the latter will be preheated, whereby the initiation of the fermentation process is accelerated.

Additional characteristics and advantages of the invention will appear from the following description, reference being had to the drawing, wherein:

Fig. 1 is a schematical view of a longitudinal section through a container with aeration medium admission apertures disposed in the shell of the container, Fig. 2 shows the container according to Fig. 1, as seen from the end and partly in section on the line A—A in Fig. 1, Fig. 3 is an end view of a distributor ring, on the line B—B in Fig. 2, Fig. 4 shows a section through the shell of the container on the line C—C in Fig. 1, Fig. 5 is a second embodiment of the construction according to Fig. 4, Fig. 6 shows part of the shell of the container on the line D—D in Fig. 1, Fig. 7 is a section on the line E—E in Fig. 6, Fig. 8 shows schematically a longitudinal section through another embodiment of the container with aeration medium admission through an aeration medium feeding device extending in the longitudinal direction of the container, Fig. 9 illustrates a combination of the embodiments of the container shown in Figs. 1 and 8, Fig. 10 shows schematically another embodiment of the container, and Fig. 11 is a transverse section through still another embodiment of the container with individual fermentation compartments.

In the following, the materials to be treated according to the invention will be called waste materials. These waste materials are of the kind referred to and may e.g. consist of pure garbage or other refuse, but also of such garbage or refuse mixed e.g. with slaughtery refuse which is rich of fats, or e.g. with sludge of the kind referred to or consist of pure, considerably dried sludge. However, the materials may in no case be in the state of a slurry, but must be more or less dry.

The waste materials may be used in their natural state or after having been pretreated, e.g. preground.

Furthermore, the aeration medium will in the following be simply called for air, but this medium may if required also be any other suitable oxygen medium or oxygen enriched or oxygen carrying medium.

Moreover, the process will be described in connection with a cylindrical drum to be filled with the waste materials, but it will be understood, that any other suitable container form may be used for processing said materials.

Finally, the process will be described as a continuous one, i.e. that waste materials are continuously fed into said drum, and fermented materials are continuously withdrawn therefrom. It has been formerly indicated in what way "continuously" has to be understood. The possibility for continuous operation of the process is one of the most essential advantages obtained according to the invention. However, it will be understood, that the radial aeration according to the invention is not bound to such continuous operation, but may also be used in connection with processes, in which the waste materials are fermented batchwise. Also in this case, a considerable acceleration of the fermentation will be obtained in comparison with the known processing methods.

As appears from the drawings, notably Fig. 1, a container consists of an oblong, cylindrical rotatable drum 10 with a feeding unit in the form of a supply worm 14 for waste materials, disposed at one end plate 12 of the drum, and a discharge unit in the form of an emptying worm 18 for compost, disposed at the other end plate 16 of the drum. Longitudinally of the shell of the drum there are provided apertures 20, through which compressed air can be blown into the interior of the drum, which air is supplied to the apertures 20 through ducts 22, a number of which being arranged on the shell of the drum. As appears from Fig. 4, said ducts may be disposed on the outside of the shell of the drum, so that the interior surface of the drum is smooth and uninterrupted.

If desired, the apertures may, however, also be designed as holes 20a drilled in ducts 22a with triangular cross-section disposed on the interior wall of the drum, see Fig. 5.

It may be expedient to use a combination of the ducts shown in Figs. 4 and 5, ducts of the kind shown in Fig. 5 being used at the ends of the drum (within the preheating zone or the drying zone, hereinafter described, or within both), whereas the use of ducts as shown in Fig. 4 may be reserved for the intermediate part of the drum, the main fermentation zone described in the following.

Furthermore, apertures 24 are disposed particularly in the intermediate part of the drum, through which apertures water or any other wetting medium supplied to the apertures 24 through a pipe 26 can be spread in the interior of the drum.

The ducts 22 or 22a and the pipe 26 extend to the left end of the drum 10, where they are connected by means of a distributor member shown in Figs. 2 and 3 to sources, not shown, for the supply of air under pressure and water, respectively, through pipes 28 and 30, respectively. The distributor member 32, shown schematically in Fig. 3, is connected with said pipes 28 and 30 and provided with slits 34 and 36 for the passage of compressed air and water, respectively. Said slits are arranged at different distances from the center of the ring and cooperating with the ends of the ducts 22 and 22a and the pipe 26, respectively, in such a way that compressed air is supplied only to the ducts or apertures which are lowermost during the rotation of the drum, whereas water is supplied only to the pipes or apertures which are uppermost during the rotation of the drum. Such a construction is generally known, so that further mention is presumably unnecessary.

Instead of being provided with air from a single air source, e.g. by means of a distributor member as shown, each duct 22 or 22a or groups of such ducts may be provided with their electrically operated fan, which may be positioned outwardly on the shell of the drum and rotate together with it. Such fans may be connected with an electrical source in any suitable manner.

In the shell of the drum there are furthermore provided apertures 38, see Figs. 6 and 7, which are spaced over the area of the shell.

Though not imperative it is to be preferred in view of certain operational conditions to be described in the following to have the largest number of such apertures disposed in the part of the drum shell which is close to the supply worm 14, as indicated in Fig. 1.

Waste materials supplied to the drum through the supply worm 14 will travel through the drum from the left to the right in Fig. 1 during its rotation. In order to facilitate this movement it may be expedient to dispose the drum on a somewhat inclined plane, so that the materials filled into the drum will gradually travel towards the discharge worm 18, impelled by gravity. However, the feeding and discharge of the drum may be obtained by any other suitable mechanism, too, e.g. by means of piston members.

During operation the drum shown in Fig. 1 may be regarded as being divided into three zones a preheating zone I, a main fermentation zone II, and a drying zone III, as it will be described in the following.

Waste materials fed into the drum 10 at its left end will be rotated and tumbled by means of the drum and, thereby, be rubbed or partly self-ground.

Preferably, the drum will be rotated continuously, but it may also be advantageous to rotate said drum intermittently. Furthermore, air is supplied through the apertures 20 as later described, in order to start the fermentation process as soon as possible and to impart an optimal temperature of 35–50° C. to the materials, seeing that the maximum speed of fermentation has proved to be obtainable at this temperature. Generally, and especially in the case of house refuse, the waste materials will themselves contain enough moisture to assure sufficient saturation by moisture of the mass of material filled into the drum. If necessary, however, there may be disposed a few water apertures 24 in this zone of the drum, which apertures preferably should be so designed that they can be connected to the water pipe 26 if and when required, so that the water supply can be regulated accordingly.

It is likewise possible to use preheated air for preheating the materials in the drum in order to initiate the starting of the fermentation.

This zone of the drum 10, in which the aerobic, thermophilic fermentation is starting, has been called the preheating zone I, inasmuch as the temperature of the waste materials in this zone will grow to its optimal temperature. However, it will be understood, that during this temperature increasing process also an initial fermentation will take place.

After having obtained their optimal temperature, the waste materials will when proceeding their travel through the drum, be continuously fermented, and for a certain period of this fermentation process the temperature thereof will be virtually constant. The materials travel through a zone of the drum called the main fermentation zone II. In practice it has proved most suitable to maintain over the greater part of this zone the said temperature of app. 35–50° C. in the material.

When the fermentation process has been started, this temperature range will quickly be reached, and the fermentation may then become so powerful that the range is exceeded. It may therefore be necessary to cool the fermenting mass. This may suitably be accomplished by increasing the admission of air to the mass. Increased supply of air, however, will entail desiccation of the fermentating mass, and it may therefore be necessary to add water thereto, so that a suitable percentage of moisture in the mass is assured. The addition of water will contribute to a sufficient percentage of moisture in the discharge gases, so that they are capable of removing sufficient quantities of heat from the mass.

In countries with hot climates, for instance, it may be necessary furthermore to cool the walls of the drum, so as to assure also by this means the maintenance of a suitable fermentation temperature in the drum.

Even if the temperature range between app. 35–50° C. must be considered the most suitable for obtaining the best speed of fermentation, it may be desired to allow the temperature of the mass to rise to app. 60–70° C. by restricting the cooling, so that the mass is subjected to a pasteurisation. This heating may take place in any part of the main fermentation zone whatever, but it will be most suitable to assign it to the hindmost end of the zone, as seen in the direction wherein the mass travels through the drum. If the pasteurisation were assigned e.g. to the foremost part of the main fermentation zone, it would be necessary after pasteurisation to cool the mass in order to continue its suitable fermentation, and in connection therewith to increase its percentage of moisture. If, on the other hand, the pasteurisation is effected in the hindmost end of the zone II, the mass will travel direct into the drying zone after pasteurisation, so that the desiccation is hastened.

The air required for the fermentation is forced into the interior of the drum through the apertures 20 which are lowermost during the rotation of the drum. As appears from the drawing such apertures are provided over part of the length of the drum.

On account of the apertures 20 being disposed in the shell of the drum and the air being admitted from below into the mass of material, the latter will act as a valve for the discharge of air. As the mass is rotated, it will on all sides be under attack by compresed air, so that the air necessary for a satisfactory fermentation is effectively supplied to the mass and uniformly distributed therein, in the axial as well as in the radial direction of the drum, whereby the fermentation is accelerated as much as possible.

If the radial admission of forced air is effected as shown from without and inwardly, improved possibilities for the cleaning of the air admission apertures are also obtained, seeing that they will be self-celaning.

When the fermentation of the materials has been virtually finished, they will have travelled so far in the drum as to be within the part denoted as drying zone III. In this zone a larger quantity of air is supplied through the apertures 20 than is required by the fermentation in its concluding stage, for which reason the contents of the drum is gradually subjected to a desiccation and cooling.

The fermented product, the compost, is thereupon removed through the emptying worm 18.

However, if wanted, the fermented product may also be removed at the end of the main fermentation zone II, without being cooled or dried.

It will now be understood that the air requirements for the various zones of the drum may differ, dependent upon the size of the drum and the character of the waste materials.

In the case of sludge supply, the moisture percentage of the drum contents may be so high that it may be desirable to subject the contents to a measure of drying in the preheating zone, so that the moisture percentage is reduced. The radial admission of air makes it possible for the quantity of air supplied to the individual zones of the drum to be distributed most suitably. This may be obtained e.g. by spacing the apertures irregularly over the length of the drum. It may also be advantageous to have a valve mechanism built into the plant, whereby certain larger or smaller numbers of the apertures or sections of apertures may be closed and opened as required.

In the process of fermentation, the oxygen contents of the air will be more or less consumed, and there is developed carbon dioxide. The exhaust gases leave the drum through the apertures 38. The production of carbon dioxide depends upon the quantity of air supplied, and thus gives an impression of the progress of fermentation. The carbon dioxide produced or the content of carbon dioxide in the discharged gases may thus be adopted as a measure of the quantity of air, which should first and foremost be supplied to the main fermentation zone, and seeing that this air is quickly and evenly distributed in the fermenting mass, so that the latter has a virtually uniform fermentation characteristic, it will be understood that thus controlled an air supply to a fermentation effected according to the invention makes it possible to maintain optimal conditions for the fermentation, so that the fermentation period may be reduced as much as possible.

During operation in practice, however, a considerable amount of said gases may escape through the feeding opening of the drum, wherefore it may be difficult to control the fermentation by means of the carbon dioxide content of the gases. Therefore, the fermentation and the air supply may be controlled dependent upon the temperature of said exhaust gases, and the openings 38 may be omitted.

The temperature of said gases may preferably be 20–40° C.

In order to make the fermentation apparatus as robust and fool-proof as possible, it may, in practice, be sufficient to alter the amount of admitted aeration medium to the container or to the different zones thereof only at larger intervals, i.e. in dependence of e.g. the average moisture content of the waste materials to be treated. Thus, it may e.g. be sufficient to operate e.g. only with two amounts for medium supply, a summer amount for typical summer garbage containing much organic constituents, such as, vegetable refuse, and where the moisture content of the garbage may rise beyond 50%, and a winter amount for typical winter garbage with a small content or organic constitutents, and where the moisture content may be less than 50%. It will be understood, that a wetting of the waste materials may be necessary especially in the case of very dry garbage.

In an embodiment, shown in Fig. 8, of a drum according to the invention, the air is admitted by means of a tube 40 instead of through apertures in the shell of the drum, said tube extending through the middle of the drum in the axial direction thereof. The hollow of the tube is in connection with the interior of the drum by means of apertures 42, and is further in connection with a source of compressed air, not shown.

Fig. 9 shows a combination of the embodiments illustrated in Figs. 1 and 8. The admission of air through the apertures 20 and 42 may be effected in a uniform or diversified manner. Also, the distribution of the apertures 20 and 42 in the longitudinal direction of the drum may differ in relation to each other, and it is thus possible to contemplate the providing of apertures 42 only in the tube 40 within the fermentation zone of the drum to satisfy the air requirements in this zone.

While travelling through the drum, the volume of the materials per unit of weight will gradually be diminished. Good results of the fermentation have proved to be obtainable, if the drum is kept well filled at least in the fermentation zone, so that the materials during the rotation of the drum will lie comparatively steadily in relation to the drum. Underfilling in this section of the drum may have the consequence that the contents is granulated by its relative movement in relation to the drum, so that wthin the sintered particles an anaerobic fermentation may take place.

It may therefore be suitable to take these matters into account when designing the drum, and to increase the diameter of the drum in the preheating zone as against that of the other part of the drum, so that there is sufficient room in the preheating zone to subject the materials to an efficacious mixing and partial disintegration or grinding (self-disintegration) under simultaneous preheating, whereupon the pretreated material is conveyed to the main fermentation zone of the drum, the diameter of which is smaller.

One embodiment of such a drum is shown schematically in Fig. 10.

The embodiment of the drum shown in Fig. 10 can be used with advantage in cases when the feeding of the waste materials and the discharging of fermented material is effected at prolonged intervals.

For large plants with drums of e.g. 10–30 metres' length it is advantageous to avail oneself of automatic feeding and discharging of material by means of e.g. worm conveyors, piston conveyors or the like.

In plants where the transverse section of the drum is large, it may be expedient—instead of having the interior of the drum as one large processing compartment—to divide the interior of the drum, leastways the main fermentation zone of the drum, by means of walls into a number of mutually separated substantially cylindrical compartments, which extend in the longitudinal direction of the drum. A transverse section through such a drum is shown schematically in Fig. 11, where the drum is divided into 4 compartments by means of walls 44.

Such division of the interior of the drum has several advantages. In the first place the walls 44 brace the shell of the drum, so that it can be manufactured of comparatively thin sheet material.

Another advantage is that the drum can more easily be made to rotate, than if the interior of the drum were undivided. In the latter case a greater mass of material will be collected in the lowermost part of the drum, than if the drum is divided into several compartments, each of which is filled with material to be treated, and in which case the weight of the material in the uppermost compartments will facilitate the rotation of the drum.

Furthermore, the dividing of the drum by means of internal walls will make it possible to provide ducts in the walls, through which said ducts air or fluid or both can be supplied to the interior of the compartments, so that the contents thereof is subjected to the proper treatment. Moreover, the corners of the compartments are preferably somewhat rounded, so that adjoining walls automatically form limitations for the ducts. One embodiment according to the foregoing is shown in Fig. 11, where ducts 46 and 48 are formed and limited by walls 44, the latter ducts being closed outwardly by means of the sheet material of the drum shell.

If necessary, the fermented material may be subjected to a sifting after removal, and components not fermented may be re-directed to the drum.

Normally, the fermentation can be expected to last for 3–5 days, dependent on the character of the waste materials, so that the drum should have a volume suitable for receiving and treating the waste materials collected within such a period, in order that the treatment process may be carried out continuously.

It will now be understood that the radial admission of air to the interior of the drum is of decisive importance for the establishment of an uninterrupted fermentation process with satisfactory decomposition of the waste materials, seeing that not until such supply of the air has been established will it be possible effectively to penetrate the contents of the drum with the air necessary for the treatment. It will therefore be possible to work with a comparatively high weight per litre of waste materials, as much as 0.7–0.8 kilogramme/litre. The experiments forming the basis of the invention have proved that surprisingly large quantities of air are required to obtain a quick treatment of the drum contents, seeing that it will be necessary to supply not less than one cubic metre of air per 1 kilogramme of material. In experiments with house refuse the most advantageous quantity of air was app. 3 cubic metres per 1 kilogramme of material.

The radial admission of air makes it possible, furthermore, to build drums of any required length, the air supplied to the contents of the drum being capable of effectively attacking at any place in the longitudinal direction of the drum, wherever it is desired and independently of the length of the drum. This would not be possible, however, if the air were admitted axially to the drum, because the layer of material which in this case would obtain active contact with the air would be a small one. Therefore, when using axially admitted air, it will be impossible to build a continuously working processing plant, but one would have to be content with an intermittently operating plant, in which it might be necessary to provide several fermentation tanks in order to obtain the required capacity. On the other hand, in plant or apparatus designed according to the invention, it will be possible to treat the waste materials in one continuously operated drum, and at the same time there exists the possibility of obtaining and controlling the best possible conditions for the fermentation. The apparatus according to the invention requires a minimum of mechanical attention, seeing that the apertures for the admission as well as the discharge of air are of such a nature that they cannot be obstructed.

*Example 1*

In a steel drum of 7 ft. diameter and 30 ft. length and revolving with ⅓ r.p.m. air is blown in from one of three air ducts at a time through nozzles in the steel shell. The drum is fed with daily 4 tons of raw garbage. The air is blown into the interior of the drum through the nozzles which are lowermost during the rotation of the drum at a rate of 300 cu. ft. p. min. under a pressure of 16 inch water. In the end opposite to the feeding end of the drum, the fermented compost is taken out at such a rate that the drum is kept substantially completely filled. When stationary conditions have been established the temperatures are in the feeding end 90–100° F. in the middle 125–140° F. and at the exit 110–120° F.

In a period of 35 days after stationary conditions have been established 140 tons of winter garbage of the average composition:

36% water
48% ash
16% loss by ignition are fed at a rate of 4 ton daily into the drum and in the same time 119 tons of fermented compost are removed from the drum at a rate of 3.4 ton daily of the average composition of 32% water
56% ash
12% loss by ignition The compost is easily screened on a ½ inch meshes and yield 85% fine material and 15% coarse material containing, glass bottles, wood pieces, pottery, bones and cans. The fermented garbage has a pleasant compost smell and is completely stabilized, and germ plants grow normally in a mixture of 50% compost and 50% soil.

*Example 2*

In the same stabilizer as described in Ex. 1, 160 tons in 40 days are fed at a rate of 4 tons per day of a typical summer garbage of the composition 50% water
15% ash
35% loss by ignition The yield was 104 tons at a rate of 2.6 tons daily of a very fine compost of the average composition:

38% water
23% ash
36% loss by ignition

The screening yielded 86% fine compost.
The rate of air was 400 cu. ft. p. min.

*Example 3*

In the period prescribed in Example 1 there was one day introduced a fresh pig's head together with the garbage.

The 4th and 5th day, the bones were sorted and identified in the compost leaving the stabilizer. No trace could be found of skin or meat and the bones were completely clean on the surface.

Having thus fully described our invention we claim as new and desire to secure by Letters Patent:

1. A process for making compost from uncomminuted non-fluid waste materials containing fermentable organic substances which comprises, supplying and introducing said uncomminuted non-fluid waste materials into an elongated horizontally extending enclosure adjacent one end thereof, feeding and advancing such material en masse continuously and without interruption along said enclosure from said one end to the other thereof, injecting aeration medium under pressure directly into the body of said material in a direction transverse to the flow of said material through said enclosure, and at a multitude of spaced positions along said path of flow, to ferment said material, tumbling said material while the same is moving through said enclosure by rotating said enclosure about a substantially horizontal axis to mix said materials and to transfer moisture from the relatively moist components of said materials to the relatively dry components thereof and to effect adequate aeration of the total mass, maintaining a substantial depth of said material throughout said enclosure so that the upper level of the material is above said horizontal axis to cause said aeration medium to pass through a substantial thickness of the mass of said material, regulating the injection of aeration medium into said mass along the length thereof to control the temperature resulting from said fermentation, continuing said fermentation until said material is fermented to a desired degree and discharging the treated material from the end of said enclosure opposite to said introducing end.

2. A process for making compost from uncomminuted non-fluid waste materials containing fermentable organic substances which comprises supplying and introducing said uncomminuted non-fluid waste materials into an elongated horizontally extending enclosure adjacent one end thereof, feeding and advancing such material en masse continuously and without interruption along said enclosure, injecting aeration medium under pressure directly into the body of said material from the periphery of said material mass to the interior thereof in a direction transverse to the flow of said material through said enclosure, and at a multitude of spaced positions along said path of flow, to ferment said material, tumbling said material while the same is moving through said enclosure by rotating said enclosure about a substantially horizontal axis to mix said materials and to transfer moisture from the relatively moist components of said materials to the relatively dry components thereof and to effect adequate aeration of the total mass, maintaining a substantial depth of said material throughout said enclosure so that the upper level of the material is above said horizontal axis to cause said aeration medium to pass through a substantial thickness of the mass of said material, said material effecting a valving action on the flow of said air therethrough, regulating the injection of aeration medium into said mass along the length thereof to control the temperature resulting from said fermentation, continuing said fermentation until said material is fermented to a desired degree and discharging the treated material from the end of said enclosure opposite to said introducing end.

3. A process for making compost from uncomminuted non-fluid waste materials containing fermentable organic substances which comprises, supplying and introducing said uncomminuted non-fluid waste materials into an elongated horizontally extending enclosure adjacent one end thereof, feeding and advancing such material en masse continuously and without interruption along said enclosure, injecting aeration medium under pressure directly into the body of said material from the periphery of said material mass to the interior thereof in a direction transverse to the flow of said material through said enclosure into those portions of the material mass positioned lowermost during said flow through openings in the wall of said enclosure engaged by said material during said flow, and at a multitude of spaced positions along said path of flow, to ferment said material, tumbling said material while the same is moving through said enclosure by rotating said enclosure about a substantially horizontal axis to mix said materials and to transfer moisture from the relatively moist components of said materials to the relatively dry components thereof and to effect adequate aeration of the total mass, maintaining a substantial depth of said material throughout said enclosure so that the upper level of the material is above said horizontal axis to cause said aeration medium to pass through a substantial thickness of the mass of said material, regulating the injection of aeration medium into said mass along the length thereof to control the temperature resulting from said fermentation, continuing said fermentation until said material is fermented to a desired degree and discharging the treated material from the end of said enclosure opposite to said introducing end.

4. A process for making compost from uncomminuted non-fluid waste materials containing fermentable organic substances which comprises, supplying and introducing said uncomminuted non-fluid waste materials into an elongated horizontally extending enclosure adjacent one end thereof, feeding and advancing such material en masse continuously and without interruption along said enclosure, injecting aeration medium under pressure directly into the body of said material in a direction transverse to the flow of said material through said enclosure, and at a multitude of spaced positions along said path of flow, to ferment said material, tumbling said material while the same is moving through said enclosure by rotating said enclosure about a substantially horizontal axis to mix said materials and to transfer moisture from the relatively moist components of said materials to the relatively dry components thereof and to effect adequate aeration of the total mass, maintaining a substantial depth of said material throughout said enclosure so that the upper level of the material is above said horizontal axis to cause said aeration medium to pass through a substantial thickness of the mass of said material, varying the injection of aeration medium into said mass along the length thereof to control the temperature resulting from said fermentation, continuing said fermentation until said material is fermented to a desired degree and discharging the treated material from the end of said enclosure opposite to said introducing end.

5. A process for making compost from uncomminuted non-fluid waste materials containing fermentable organic substances which comprises, supplying and introducing said uncomminuted non-fluid waste materials into an elongated horizontally extending enclosure adjacent one end thereof, feeding and advancing such material en masse continuously and without interruption along said enclosure, injecting aeration medium under pressure directly into the body of said material in a direction transverse to the flow of said material through said enclosure, and at a multitude of spaced positions along and forming part of said path of flow, to ferment said material, tumbling said material while the same is moving through said enclosure by rotating said enclosure about a substantially horizontal axis to mix said materials and to transfer moisture from the relatively moist components of said materials to the relatively dry components thereof and to effect adequate aeration of the total mass, maintaining a substantial depth of said material throughout said enclosure so that the upper level of the material is above said horizontal axis to cause said aeration medium to pass through a substantial thickness of the mass of said material, regulating the injection of aeration medium into said mass along the length thereof by admitting a certain amount of aeration medium at the intermediate portion of said length for fermenting said material, admitting a lesser amount of aeration medium at the beginning portion of said length for allowing said material to preheat and admitting a greater amount of said aeration medium at the terminating portion of said length for drying said material, continuing said fermentation until said material is fermented to a desired degree and discharging the treated material from the end of said enclosure opposite to said introducing end.

6. Apparatus for making compost from uncomminuted, non-fluid waste materials containing fermentable organic substances, which comprises a solid-walled, elongated container, means for mounting said container for rotation about a substantially horizontal axis, means for feeding uncomminuted waste material into said container at one end thereof, discharge means at the opposite end of said container for discharging treated material from said container at the opposite end thereof from said feeding end, means for injecting aeration medium into said container, said aeration medium injecting means being arranged along and forming part of the peripheral wall of the container and distributed at spaced intervals along the length of said wall in the axial direction of the container, duct means extending along said container wall, said duct means communicating with said aeration medium injection means and with a source of aeration medium under pressure, and control means for variably controlling the admission of aeration medium into said container through said injection means along the length of said container.

7. Apparatus as in claim 6, said aeration medium injection means including perforations formed in said peripheral wall and said duct means being secured to the exterior of said peripheral wall, the interior of said duct being in communication with said perforations.

8. Apparatus as in claim 6, said duct being secured to the interior of said peripheral wall, said duct having a wall thereof exposed to the interior of said container formed with openings therethrough.

References Cited in the file of this patent

UNITED STATES PATENTS

| | | |
|---|---|---|
| 761,009 | Repens-de-Schutter | May 21, 1904 |
| 1,201,385 | Takamine | Oct. 17, 1916 |
| 1,422,039 | Dean | July 4, 1922 |
| 1,521,773 | Johnson | Jan. 6, 1925 |
| 2,043,265 | Roeder | June 9, 1936 |
| 2,178,818 | Earp-Thomas | Nov. 7, 1939 |
| 2,241,734 | Petersen | May 13, 1941 |
| 2,474,833 | Eweson | July 5, 1949 |
| 2,543,776 | Greisen | Mar. 6, 1951 |
| 2,680,069 | Eweson | June 1, 1954 |